(12) United States Patent
Kaakani et al.

(10) Patent No.: US 7,363,338 B2
(45) Date of Patent: Apr. 22, 2008

(54) SELECTIVE ASSEMBLY LOADING AND EXECUTION BASED ON PLATFORM CAPABILITIES

(75) Inventors: Ziad M. Kaakani, Scottsdale, AZ (US); Murthi Nanja, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 931 days.

(21) Appl. No.: 10/196,135

(22) Filed: Jul. 17, 2002

(65) Prior Publication Data

US 2004/0015568 A1   Jan. 22, 2004

(51) Int. Cl.
*G06F 15/16* (2006.01)
*H04Q 7/20* (2006.01)

(52) U.S. Cl. .............. 709/201; 709/224; 455/435; 455/556

(58) Field of Classification Search .......... 455/435, 455/556, 566; 709/227, 229, 224, 228, 201, 709/203; 717/177
See application file for complete search history.

(56) References Cited

U.S. PATENT DOCUMENTS

| | | | |
|---|---|---|---|
| 6,857,013 B2 * | 2/2005 | Ramberg et al. | 709/223 |
| 6,938,249 B2 * | 8/2005 | Roediger et al. | 717/160 |
| 6,976,066 B1 * | 12/2005 | Mouhanna et al. | 709/223 |
| 2002/0004817 A1 * | 1/2002 | Pham et al. | 709/203 |
| 2003/0050062 A1 * | 3/2003 | Chen et al. | 455/435 |
| 2003/0051236 A1 * | 3/2003 | Pace et al. | 717/177 |
| 2003/0228869 A1 * | 12/2003 | Chow et al. | 455/432.2 |
| 2005/0256952 A1 * | 11/2005 | Mouhanna et al. | 709/223 |

* cited by examiner

*Primary Examiner*—Khanh Dinh
(74) *Attorney, Agent, or Firm*—Blakely, Sokoloff, Taylor & Zafman LLP (57) ABSTRACT

An arrangement is provided for selectively loading and executing an assembly based on platform capabilities. When an application that includes at least one platform capability-dependent assembly realized to perform a function is initiated on a platform of a device, the platform capabilities supported by the device are determined based on corresponding platform capability profiles. Based on the supported platform capabilities, specialized assemblies designed to perform an underlying function on a platform having the supported capabilities are selected. Proxies corresponding to selected specialized assemblies are then accordingly invoked to load and excuting the specialized assemblies.

23 Claims, 10 Drawing Sheets

SELECTIVE ASSEMBLY LOADING AND EXECUTION BASED ON PLATFORM CAPABILITIES

BACKGROUND

With the advancement of telecommunication technologies, many types of devices can be used for different communication purposes. For example, a cellular phone can be used not only for making phone calls but also for connecting to the Internet to, for instance, check email or download information. Different devices may support varying platforms. For an application to run on a specific device, an application developer needs to take into account of the platform capabilities that the specific device supports. For example, if a cellular phone has very limited screen display capability, the application developer of an application designed to communicate a message (e.g., an email message) to a user may utilize speech capability supported by the cellular phone to convey a textual message. The same application that communicates a message to a user may also be deployed on a personal data assistant (PDA) that supports graphics capability for screen display purposes. The variation of the application deployed on the PDA may, instead, utilize the text display capability of the PDA platform to convey a message to a user via a window.

Different functionalities may be implemented as loadable code modules corresponding to assemblies. An assembly may include meta data that is necessary for loading and executing the corresponding executable assembly. A particular functionality of an application may be realized as a set of assemblies, each of which corresponding to an implementation associated with a specific platform capability. For example, the functionality of communicating a textual message to a user may be implemented as two assemblies, one of which is to convey the textual message to a user via window display and the other of which is to convey the message to the user via speech. Depending on the specific platform capability supported on a device where the functionality is deployed, the corresponding assembly may be installed. This is static and the determination may be performed prior to the installation of the functionality. The underlying application may need to be compiled as separate versions corresponding to different platform capabilities. In addition, when the device changes its platform capabilities, different assemblies of the functionality may have to be reinstalled to match the updated platform capabilities.

BRIEF DESCRIPTION OF THE DRAWINGS

The inventions claimed and/or described herein are further described in terms of exemplary embodiments. These exemplary embodiments are described in detail with reference to the drawings. These embodiments are non-limiting exemplary embodiments, in which like reference numerals represent similar parts throughout the several views of the drawings, and wherein:

DETAILED DESCRIPTION

The processing described below may be performed by a properly programmed general-purpose computer alone or in connection with a special purpose computer. Such processing may be performed by a single platform or by a distributed processing platform. In addition, such processing and functionality can be implemented in the form of special purpose hardware or in the form of software or firmware being run by a general-purpose or network processor. Data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structures and of such data.

Figure 1:
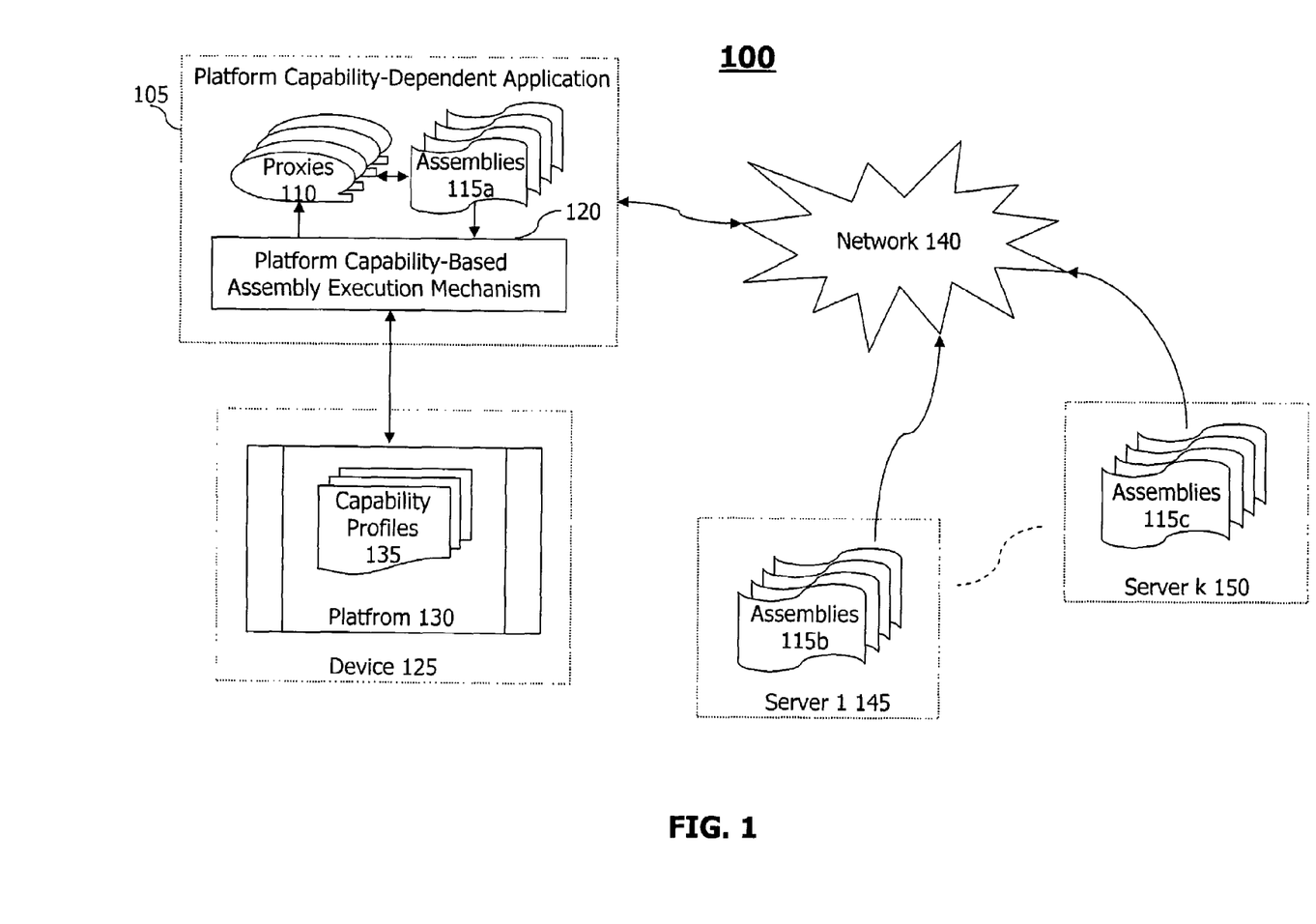
FIG. 1 depicts a framework in which an application is facilitated so that loading and execution of the application are directed to appropriate assemblies that match the capabilities supported on a platform of a device on which the application is running, according to embodiments of the present invention.

FIG. 1 depicts a framework 100 in which an application is facilitated so that loading and execution of the application are directed to appropriate assemblies that match the capabilities supported on a platform of a device on which the application is running, according to embodiments of the present invention. The framework 100 includes a device 125 that has a platform 130 and a platform capability-dependent application 105 that is running on the platform 130 of the device 125. The platform 130 may support different platform capabilities and such supported platform capabilities may be described via one or more capability profiles 135.

The device 125 represents a generic device that may be capable of various tasks such as communication or computation. Examples of such devices include, but are not limited to, a personal computer (PC), a laptop, a personal data assistant (PDA), a cellular phone, or a home appliance. The device 125 may carry out tasks on the platform 130. The platform 130 may involve, but not limited to, hardware and software. For instance, a PC may be running on an Operation System (software) platform such as Window 2000™. The platform 130 may also associate with hardware. For example, a PC may be equipped with a video card (hardware) which enable video processing tasks. The platform 130 may also correspond to a combination of hardware and software.

Figure 2:
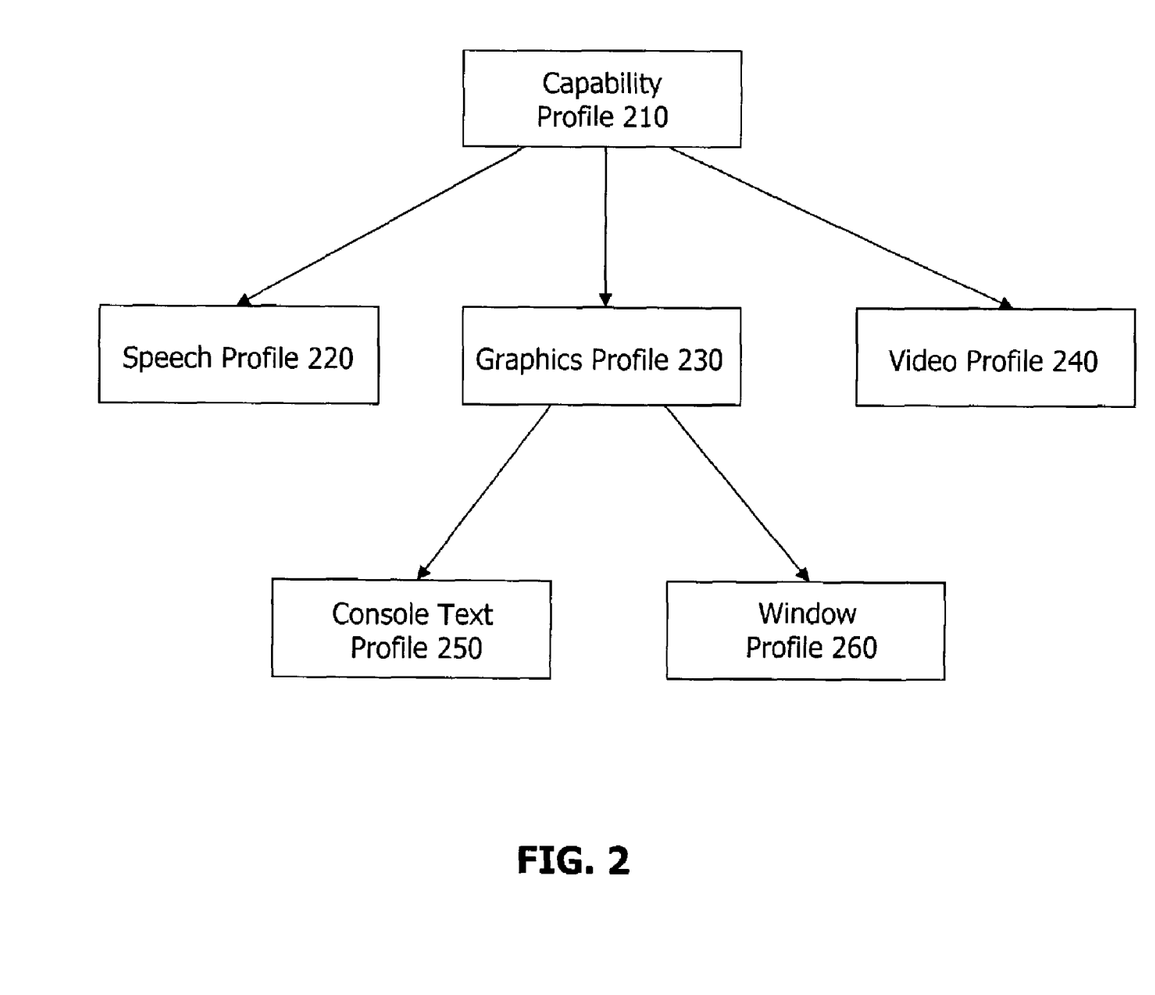
FIG. 2 illustrates exemplary types of capability profiles, according to embodiments of the present invention.

The platform 130 may support different processing capabilities such as audio capability that may involve encoding and decoding audio stream data or graphics capability that may involve speedy graphics renderings. Each of the capabilities supported by the platform 130 may be described via a capability profile. FIG. 2 illustrates exemplary types of capability profiles, according to embodiments of the present invention. A capability profile 210 may include, but are not limited to, a speech profile 220 describing supported speech data processing capability on the platform 130, a graphics profile describing supported graphics processing capability on the platform 130, and a video profile 240 describing supported video processing capability on the platform 130. The graphics capability may be further divided into console text capability described by a console text profile 250 and window capability described by a window profile 260.

Figure 3:
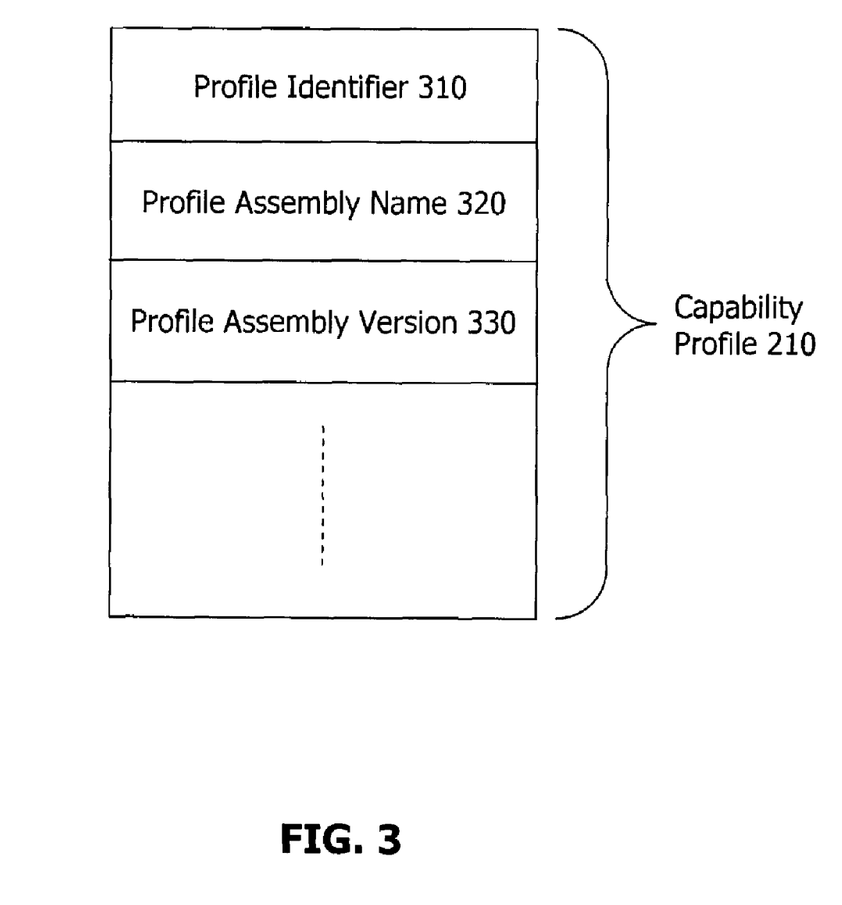
FIG. 3 illustrates an exemplary construct of a capability profile, according to embodiments of the present invention.

To describe a particular capability, the corresponding capability profile may include various types of information in the profile that may define different aspects of the supported capability. FIG. 3 illustrates an exemplary construct of a capability profile, according to embodiments of the present invention. The capability profile 210 may include, but are not limited to, elements such as a profile identifier 310 that may uniquely identify the capability, a profile assembly name 320 that specify the name of the capability (e.g., speech or video), and a profile assembly version 330. According to such information, the underlying supported capability may be unambiguously determined. For example, different version of audio card used in a PC may support different functionalities. Knowing the precise version supported on the platform 130, the capabilities can be accordingly determined.

The platform capability-dependent application 105 may be an application with a plurality of parts that perform different functions. For example, a communication application may have the capability of connecting to a different communication device (e.g., a handshake function) and then allow information exchange (e.g., message exchange functions) between the underlying device and the connected communication device. The platform capability-dependent application 105 may be running on a platform (e.g., the platform 130) of a device (e.g., the device 125) on which the application is deployed.

Functionally distinct parts of the platform capability-dependent application 105 may be realized as different assemblies (including assemblies 115*a*, 115*b*, . . . , and 115*c*). An assembly may correspond to a code module with possibly other resources that implements a unit of functionality. An assembly may be loaded and executed when the functionality it represents is to be performed. An assembly may reside locally on the device on which the application is running (e.g., assemblies 115*a*) or reside remotely on some server or other devices (e.g., assemblies 115*b* and assemblies 115*c*). The assemblies that are stored remotely may be downloaded by the platform capability-dependent application 105 whenever they are needed for execution.

Depending on the capabilities supported by the platform 130, the platform capability-dependent application 105 may behave differently during its execution. For instance, the platform capability-dependent application 105 may communicate a textual message to a user of the device 125. Depending on supported platform capabilities, there may be different ways to communicate the message to the user. If the underlying platform 130 supports window graphics capability, the message may be displayed in a textual form in a window. If the underlying platform 130 supports only audio capability, the platform capability-dependent application 105 may first convert the textual message into speech form (e.g., via text to speech or TTS technologies) and then playback the converted speech message to the user. For example, a cellular phone may be equipped with an application that is capable of conveying a textual message downloaded from the Internet to its user via speech form.

The platform capability-dependent application 105 may provide a same function in different forms. For example, if the communication application described in the above example is deployed on a PC which supports graphics capabilities, the application may convey the textual message in its original textual form in a, for example, window environment. But if the same application is deployed on a cellular phone and if there is no support of graphics display, the application may choose to convey the textual message in its speech form to the user. The decision in terms of the communication manner may depend on the supported platform capabilities of the device on which the application is deployed.

To facilitate dynamic determination of how a particular function (i.e., conveying a textual message to a user) is to be performed (e.g., convey the message in textual or speech form), the platform capability-dependent application 105 may be developed to include, with respect to the function, a plurality of specialized assemblies, each of which is capable of performing the function in a different manner corresponding to a particular platform capability. A platform capability-based assembly execution mechanism 120 is responsible for determining which assembly is to be executed according to platform capabilities supported by the platform 130 of the device 125. To make such a dynamic decision, the platform capability-based assembly execution mechanism 120 queries the capability profiles 135 of the platform 130 to determine what capabilities are supported on the platform. Based on the supported platform capabilities, the platform capability-based assembly execution mechanism 120 then selects assemblies that are appropriate with respect to the supported platform capabilities. Details about the platform capability-based assembly execution mechanism 120 are discussed with reference to FIGS. 5, 7, 8, and 9.

Figure 4:
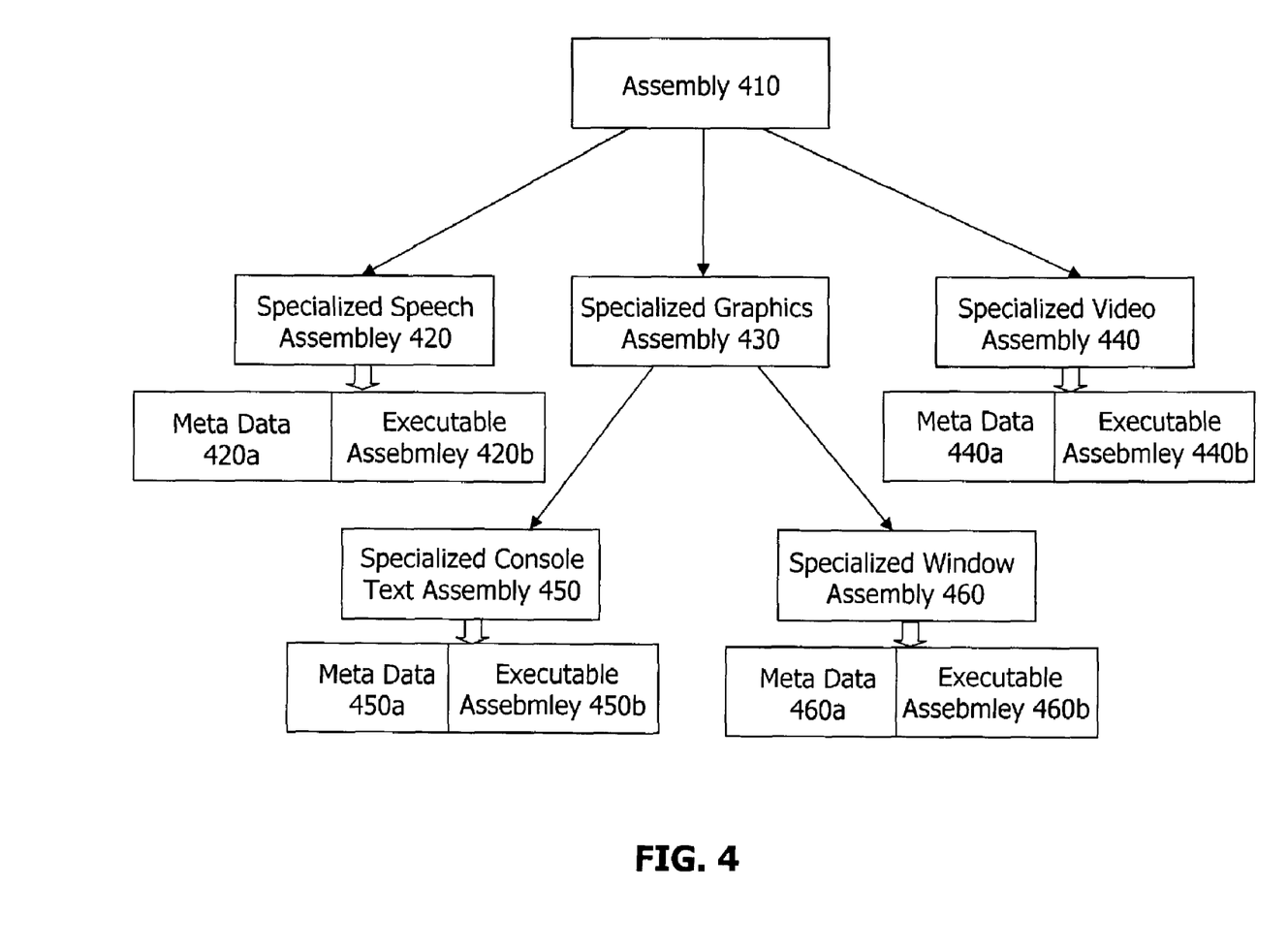
FIG. 4 illustrates an exemplary assembly with a plurality of specialized assemblies, each of which associates with a corresponding platform capability, according to embodiments of the present invention.

FIG. 4 illustrates an exemplary assembly with a plurality of specialized assemblies, each of which associates with a corresponding platform capability, according to embodiments of the present invention. For instance, an assembly 410 may be developed to include a specialized speech assembly 420, a specialized graphics assembly 430, and a specialized video assembly 440. The specialized graphics assembly 430 may be further developed to include two distinct specialized assemblies: a specialized console text assembly 450 and a specialized window assembly 460.

Each of the specialized assemblies corresponds to a platform capability. For example, the specialized speech assembly 420 may be executed when an underlying platform supports speech capability. The specialized graphics assembly, either the specialized console text assembly 450 or the specialized window assembly 460, may be executed when an appropriate graphics capabilities (i.e., console text capability or window capability) is supported. The specialized video assembly 440 may be executed when the corresponding video capability is supported.

Each assembly may include information that is necessary for its execution. For example, in addition to an executable code module of the assembly, an assembly may also contain certain meta information that, for example, direct the correct use, loading and execution of the executable code module. For example, such meta information may include, but are not limited to, specification of required platform capability in order to be properly executed or the entry point of the corresponding executable code module. In FIG. 4, the specialized speech assembly 420 includes an executable assembly 420*b* and meta data 420*a*. The specialized video assembly 440 includes an executable assembly 440*b* and meta data 440*a*. The specialized console text assembly 450 includes an executable assembly 450*b* and meta data 450*a*. The specialized window assembly 460 includes an executable assembly 460*b* and meta data 460*a*.

In FIG. 1, the platform capability-dependent application 105 loads and executes different assemblies via corresponding proxies 110. Each proxy may correspond to an associated assembly. When the platform capability-based assembly execution mechanism 120 determines a specialized assembly, it may invoke a corresponding proxy to load the specialized assembly from a proper location and then execute the assembly. The corresponding proxy may determine the location where the needed specialized assembly resides and then load it onto the device 125 for execution.

A specialized assembly may or may not reside on the device where the underlying application is deployed. The needed specialized assembly may be stored on a server across a network 140. The network 140 may represent a generic network, which may correspond to a local area network (LAN), a wide area network (WAN), the Internet, a wireless, or a proprietary network.

A proxy may be implemented in such a way that it is capable of determining the location of a specialized assembly and loading the assembly from such determined location. For example, an assembly may be residing on the device where the underlying application is deployed. In this case, the corresponding proxy may execute the assembly directly. If an assembly is stored on a remote server, the corresponding proxy may connect to the server, download the assembly, store the downloaded assembly locally, and then execute the assembly. For example, as shown in FIG. 1, the assemblies 115*b* may be stored on server 1 145 and the assemblies 115*c* may be stored on a different server 2 150. A proxy may be able to locate the site of a specific assembly and download the assembly from the site. Details about a proxy are discussed in detail with reference to FIGS. 6, 7, and 10.

Figure 5:
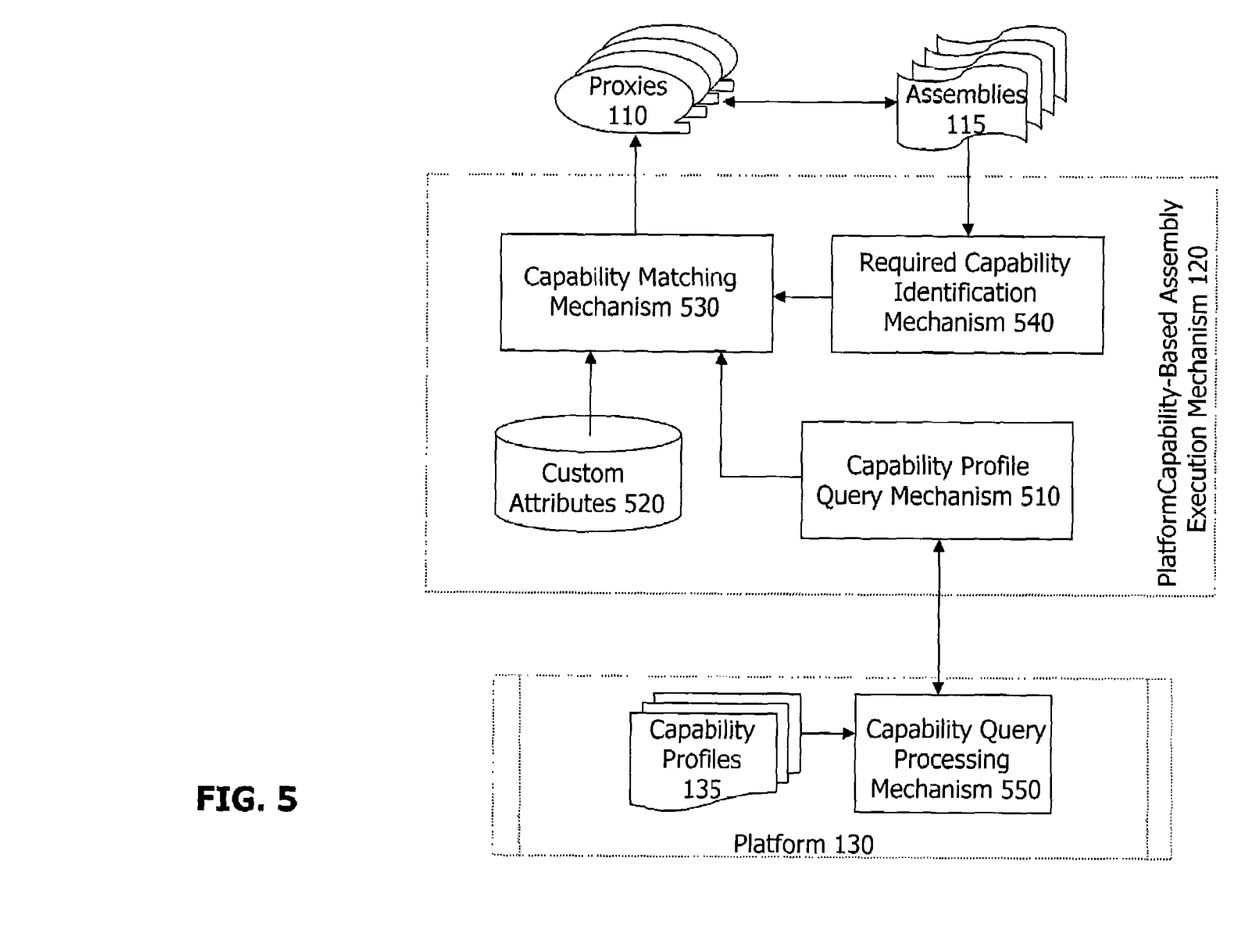
FIG. 5 depicts an exemplary high level functional block diagram of a platform capability-based assembly execution mechanism, according embodiments of the present invention.

FIG. 5 depicts an exemplary high level functional block diagram of the platform capability-based assembly execution mechanism 120, in relation to the platform 130, according embodiments of the present invention. The platform capability-based assembly execution mechanism 120 comprises a capability profile query mechanism 510, a plurality of custom attributes 520, a required capability identification mechanism 540, and a capability matching mechanism 530.

The capability profile query mechanism 510 is responsible for determining the platform capabilities supported by the platform 130 of the device 125. It may send a query to a capability query processing mechanism 550 in the platform 130. After receiving the query from the capability profile query mechanism 510, the capability query processing mechanism 550 may retrieve the capability profiles 135 and returns the profiles to the capability profile query mechanism 510. These returned capability profiles describe the supported platform capabilities based on which appropriate specialized assemblies can be determined.

To identify an appropriate specialized assembly based on supported capabilities, the required capability identification mechanism 540 retrieves information related to required capabilities of the assemblies. Such information may be stored in the assemblies as meta data (as shown in FIG. 5). When assemblies are stored at a remote site, such information may also be retrieved from the remote site across the network 140. Required platform capabilities may be determined based on such retrieved information.

Information related to both supported capabilities (on the platform 130) and required capabilities (by assemblies) is forwarded to the capability matching mechanism 530 to identify a specialized assembly that requires a capability supported by the platform 130. The capability matching mechanism 530 selects a specialized assembly whose required platform capability is one of the capabilities supported by the platform 130 and identified previously by the capability profile query mechanism 510. For example, to convey a textual message to a user, the assembly that performs this function may have two specialized assemblies. One specialized assembly may correspond to conveying the message to the user in a textual form via a window environment and may require a window platform capability in order to function properly. The other specialized assembly may correspond to conveying the message to the user in a speech form and may require speech-processing capability on the underlying platform. The first specialized assembly may be selected as appropriate when its underlying application is deployed on, for example, a PC with window platform support. The second specialized assembly may be selected as appropriate when its underlying application is deployed on, for instance, a cellular phone where a window environment is not supported by the platform of the cellular phone.

If a platform supports capabilities required by more than one specialized assemblies, the capability matching mechanism 530 may select one specialized assembly according to some pre-determined priority. Such pre-determined priority may be specified through the custom attributes 520 and may be used for the selection of a most desirable specialized assembly. For instance, a PC platform may support both speech processing and window environment. In this case, the capability matching mechanism 530 may first identify a best-fit capability based on a priority indicator specified in the custom attributes 520. Based on the best-fit capability, the capability matching mechanism 530 then identifies a specialized assembly corresponding to the best-fit capability. For example, a cellular phone may support both console text capability and speech capability. However, the speech capability may be specified as preferred capability due to, say, the size of the display screen on the cellular phone.

The custom attributes 520 may be pre-defined when the platform capability-dependent application is developed. The custom attributes 520 may also have different versions, depending on the platform of the device where the underlying application is to be deployed. For example, with respect to a PC platform, the window capability may be preferred compared with speech capability whereas on a PDA platform the speech capability may be preferred. In this case, different versions of the custom attributes 520 may be incorporated in the platform capability-dependent application 105 to assist dynamic determination of a best-fit capability.

Figure 6:
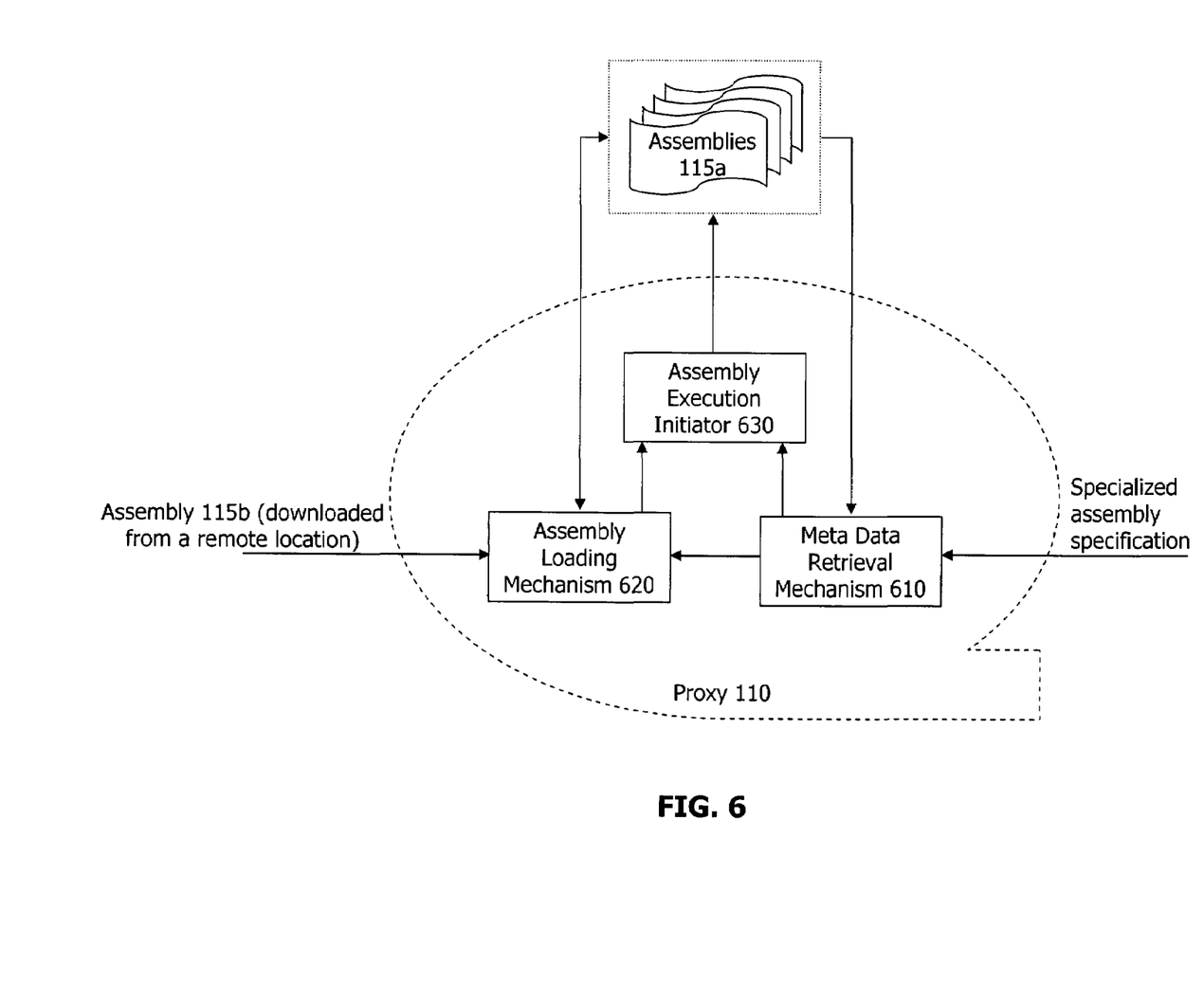
FIG. 6 depicts an exemplary high level functional block diagram of a proxy, according to embodiments of the present invention.

FIG. 6 depicts an exemplary high level functional block diagram of a proxy, according to embodiments of the present invention. A proxy is responsible for loading a specialized assembly (determined by the capability matching mechanism 530) and execute the loaded assembly. A proxy (e.g., proxy 110) may be connected to one or more specialized assemblies, which may or may not reside locally. To load a specialized assembly from a proper location and execute the assembly, a proxy comprises a meta data retrieval mechanism 610, an assembly loading mechanism 620, and an assembly execution initiator 630.

To determine the location of a specialized assembly, the meta data retrieval mechanism 610 may first determine whether it is the first time that the specialized assembly is invoked. This may be determined according to some information related to the assemblies. For example, if the access information of the specialized assembly is not available, this may simply indicate that it is the first time that the specialized assembly is invoked. There may be other means to facilitate the decision making in terms of whether it is the first time a specialized assembly is invoked. For example, meta data about specialized assemblies may be built in with the underlying application and such meta information may specify the current location of the assemblies. Such meta information may be updated when the location of the assemblies changes. For example, location information initially may indicate from where an assembly can be downloaded (e.g., from a server). After the assembly is downloaded and stored locally, the location information associated with the assembly may be update to reflect that.

The meta data retrieval mechanism 610 accesses such meta information and determines the location of a specialized assembly. It may then invoke the assembly loading mechanism 620 to load the assembly from the identified location. When the location is local, the meta data retrieval mechanism 610 may also pass information related to the entry point of the assembly to the assembly loading mechanism 620. When the location is remote, the assembly loading mechanism 620 may initiate a connection with the remote site and download the assembly accordingly. The downloaded assembly may then be stored locally for execution or future access. Relevant meta information may be updated to record the current location of the downloaded assembly.

The assembly execution initiator 630 initiates the execution of an assembly. The entry point of the assembly may be provided by either the meta data retrieval mechanism 610 or the assembly loading mechanism 620.

Figure 7:
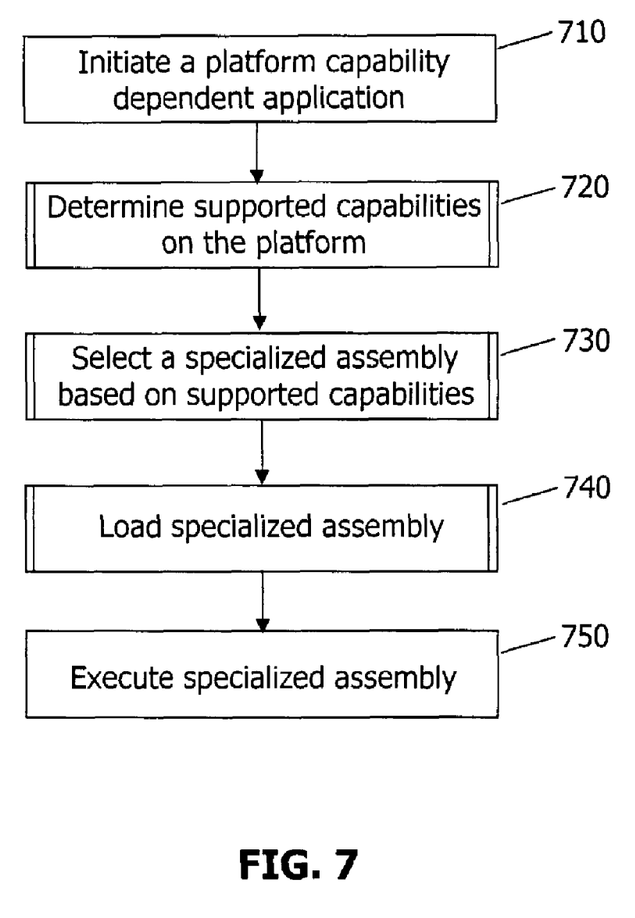
FIG. 7 is a flowchart of an exemplary process, in which an application is facilitated so that loading and execution of the application are directed to appropriate assemblies that match the capabilities supported on the platform of a device on which the application is running, according to embodiments of the present invention.

FIG. 7 is a flowchart of an exemplary process, in which an application is facilitated so that loading and execution of the application are directed to appropriate assemblies that match the capabilities of the platform on which the application is running, according to embodiments of the present invention. The platform capability-dependent application 105 is first initiated, at 710, on a device (e.g., the device 125) with a platform (e.g., the platform 130). The capabilities supported by the platform 130 are determined at 720, via capability profile query. Based on the identified supported capabilities, a specialized assembly is selected, at 730, that match a specified best-fit platform capability. The selected specialized assembly is then loaded, at 740, from a dynamically identified location and is executed at 750. Exemplary processes of determining the supported capabilities, selecting a specialized assembly, and loading a specialized assembly are described with reference to FIGS. 8, 9, and 10.

Figure 8:
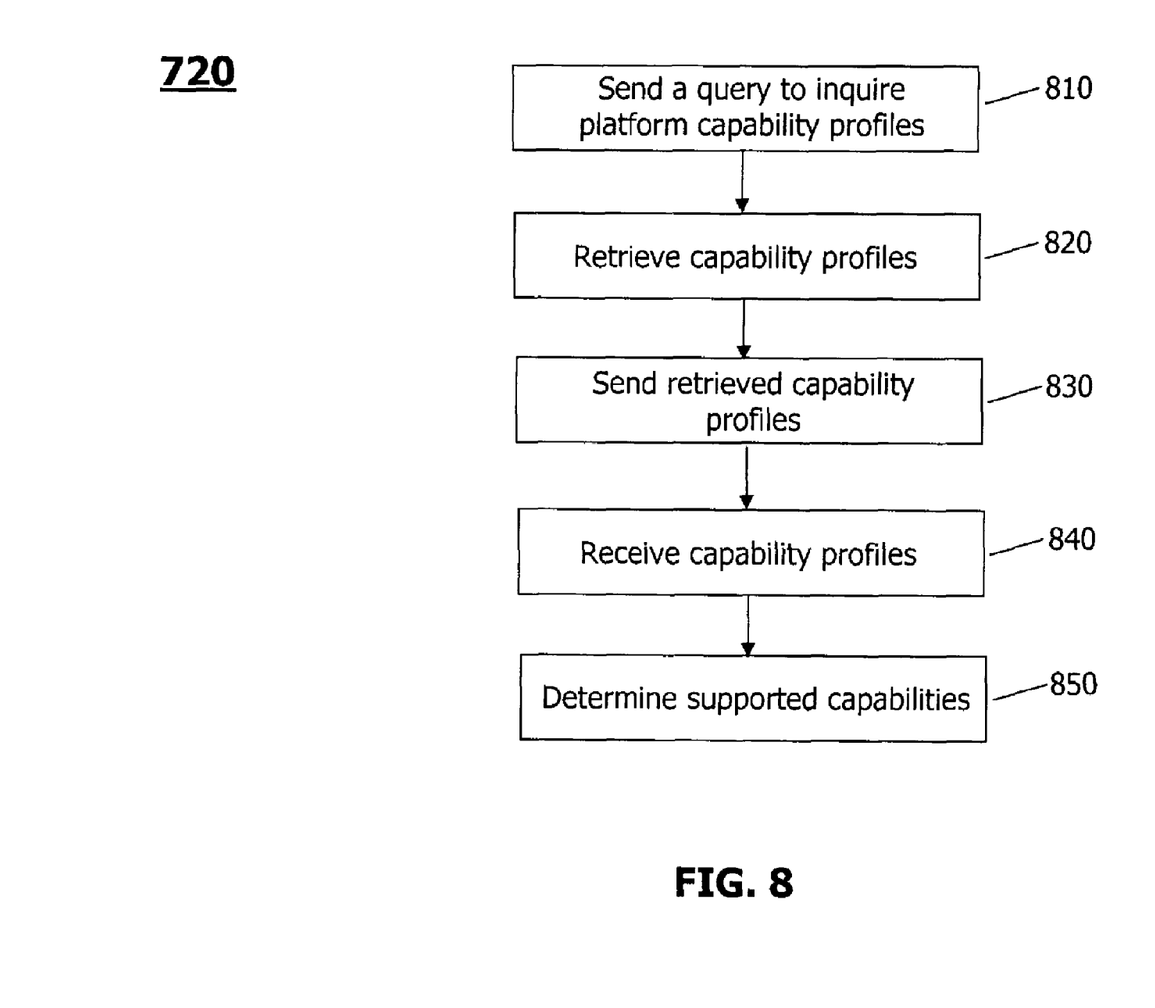
FIG. 8 is a flowchart of an exemplary process, in which supported platform capabilities are determined via capability profile query, according to embodiments of the present invention.

FIG. 8 is a flowchart of an exemplary process, in which supported platform capabilities are determined via capability profile query, according to embodiments of the present invention. The capability profile query mechanism 510 sends, at 810, a query to the capability query processing mechanism 550 of the platform 130. After receiving the query, the capability query processing mechanism 550 retrieves, at 820, the capability profiles 135 and sends, at 830, the retrieved profiles to the capability profile query mechanism 510. After receiving, at 840, the capability profiles 135, the capability profile query mechanism 510 determines, at 850, the supported platform capabilities based on the capability profiles 135.

Figure 9:
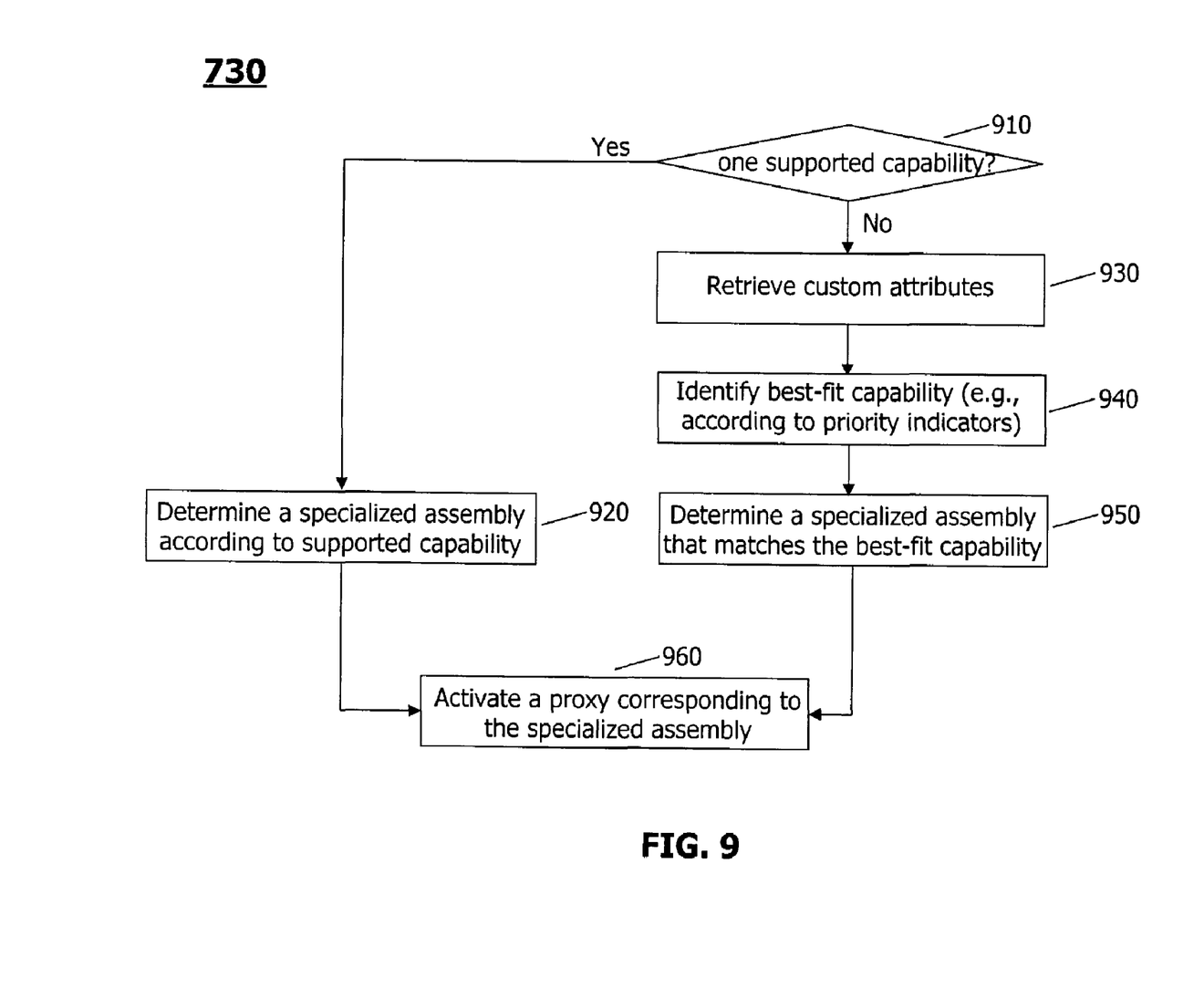
FIG. 9 is a flowchart of an exemplary process, in which a capability matching mechanism determines a specialized assembly suitable with respect to a corresponding platform capability, according to embodiments of the present invention.

FIG. 9 is a flowchart of an exemplary process, in which the capability matching mechanism 530 selects a specialized assembly suitable with respect to a corresponding platform capability, according to embodiments of the present invention. It is first determined, at 910, whether more than one capability is supported by the underlying platform 130. If there is only one supported capability, the capability matching mechanism 530 determines, at 920, a specialized assembly that fits the supported capability.

If more than one platform capabilities are supported, the capability matching mechanism 530 retrieves, at 930, the custom attributes 520 from which priority indicators may be extracted. According to the priority indicators, the capability matching mechanism 530 identifies, at 940, a best-fit capability that is then used to determine, at 950, a specialized assembly that matches the best-fit capability. After the specialized assembly is selected, the capability matching mechanism 530 activates, at 960, a proxy that corresponds to the selected specialized assembly.

Figure 10:
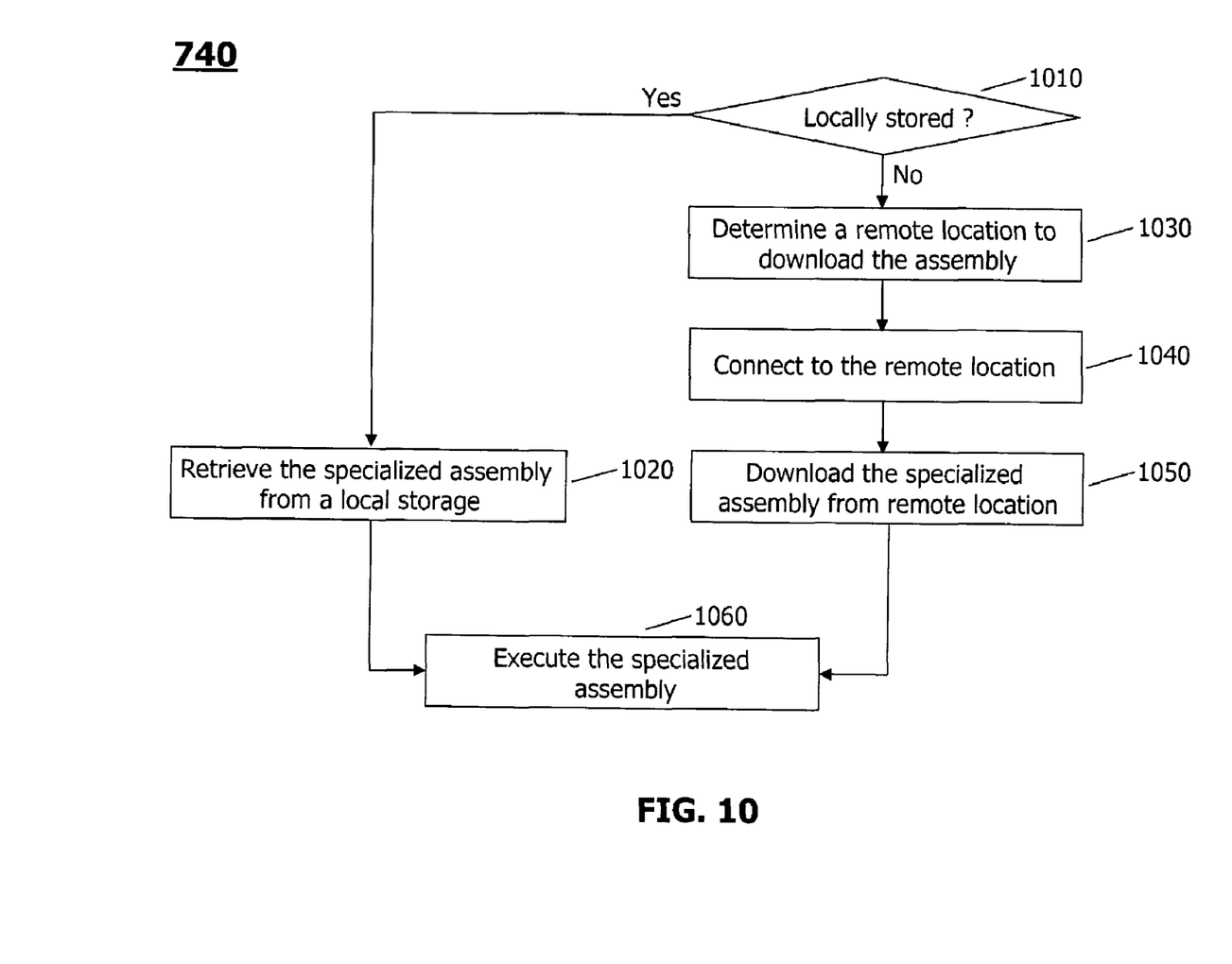
FIG. 10 is a flowchart of an exemplary process, in which a proxy loads a specialized assembly from a dynamically determined location, according to embodiments of the present invention.

FIG. 10 is a flowchart of an exemplary process, in which a proxy loads a specialized assembly from a dynamically determined location, according to embodiments of the present invention. After being activated, a proxy corresponding to a selected specialized assembly may first determine, at 1010, whether the specialized assembly currently resides locally. If the specialized assembly is stored locally, the proxy retrieves (or loads), at 1020, the specialized assembly from a local storage.

If the specialized assembly is not stored locally, the proxy determines, at 1030, the remote location of the specialized assembly. To download the specialized assembly, the proxy connects, at 1040, to the remote location and downloads, at 1050, the specialized assembly from the remote location. After the specialized assembly is loaded, either from a local storage or a remote location, the proxy executes, at 1060, the specialized assembly.

While the invention has been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the appended claims.

What is claimed is:

1. A method, comprising:

initiating an application on a platform of a device, the application including a platform capability-dependent assembly to perform a specific function of the application;

determining at least one capability that the platform supports according to at least one capability profile of the platform, the at least one capability being a processing capability of the platform including at least one of an audio processing capability, a video processing capability, and a graphics processing capability;

dynamically selecting a first specialized assembly associated with the platform capability-dependent assembly if the capability profile indicates that the platform supports a first capability;

dynamically selecting a second specialized assembly associated with the platform capability-dependent assembly if the capability profile indicates that the platform supports a second capability, wherein said selecting a specialized assembly comprises:

determining whether there are more than one capability supported on the platform of the device;

retrieving custom attributes when there are more than one capability supported by the platform of the device;

identifying a best-fit capability according to at least one custom attribute specifying priority among different capabilities;

determining the specialized assembly corresponding to the best-fit capability, wherein the capability required by the specialized assembly matches the best-fit capability; and determining the specialized assembly wherein the capability required by the specialized assembly is supported by the platform when there is only one supported capability; and executing the selected specialized assembly on the platform via a proxy corresponding to the specialized assembly.

2. The method according to claim 1, wherein said determining the at least one supported capability comprises:

sending a query to the platform of the device to obtain the at least one capability profile, each of which describing a capability supported by the platform of the device;

receiving the at least one capability profile from the platform of the device; and determining the at least one supported capability based on the at least one capability profile.

3. The method according to claim 2, wherein each of the at least one capability profile includes at least one of: a profile identifier capable of uniquely identifying a capability supported by the platform; a profile assembly name representing an assembly corresponding to the supported capability; and a profile assembly version representing the version of the assembly of the supported capability.

4. The method according to claim 3, wherein the platform capability-dependent assembly includes at least one specialized assembly, each of which includes meta data and executable code of the specialized assembly.

5. The method according to claim 4, wherein the meta data in each of the at least one specialized assembly includes at least one of: a capability required to execute the specialized assembly; and an entry point from which the specialized assembly is executed.

6. The method according to claim 1, further comprising loading the specialized assembly prior to said executing.

7. The method according to claim 6, wherein said loading the specialized assembly comprises:

retrieving the specialized assembly from a local storage if the specialized assembly is locally stored; and retrieving the specialized assembly from a remote location if the specialized assembly is not locally stored.

8. The method according to claim 7, wherein said retrieving from a remote location comprises: determining the remote location where the specialized assembly is stored; connecting to the remote location; and downloading the specialized assembly from the remote location.

9. A system, comprising:

a device;

a platform on the device capable of supporting at least one supported capability, wherein the platform includes at least one capability profile that describes the at least one supported capability, and wherein the at least one capability is a processing capability of the platform including at least one of an audio processing capability, a video processing capability, and a graphics processing capability; and a platform capability-dependent application to run on the platform in a fashion consistent with the at least one supported capability of the platform of the device, the application further including:

at least one assembly including specialized assemblies that each perform a different supported capability of the platform;

a platform capability-based assembly execution mechanism capable of dynamically selecting a first specialized assembly associated with the platform capability-dependent assembly if the capability profile indicates that the platform supports a first capability or a second specialized assembly associated with the platform capability-dependent assembly if the capability profile indicates that the platform supports a second capability, wherein selecting a specialized assembly comprises determining whether there are more than one capability supported on the platform of the device, retrieving custom attributes when there are more than one capability supported by the platform of the device, identifying a best-fit capability according to at least one custom attribute specifying priority among different capabilities, determining the specialized assembly corresponding to the best-fit capability, wherein the capability required by the specialized assembly matches the best-fit capability and determining the specialized assembly wherein the capability required by the specialized assembly is supported by the platform when there is only one supported capability; and at least one proxy, each of which is associated with a corresponding specialized assembly, capable of accessing and executing the selected specialized assembly.

10. The system according to claim 9, wherein the specialized assembly is stored locally on the device and is retrieved by a corresponding proxy from a local storage.

11. The system according to claim 10, wherein the specialized assembly is stored remotely at a different location than the device and is downloaded by a corresponding proxy from the remote location.

12. The system according to claim 11, wherein the platform capability-based assembly execution mechanism comprises:

a required capability identification mechanism capable of identifying at least one required capability necessary for an assembly to be executed on the platform of the device;

a capability profile query mechanism capable of querying and receiving the at least one capability profile from the platform to identify the at least one supported capability; and a capability matching mechanism capable of matching the at least one required capability necessary for the assembly to run on the device with the at least one supported capability to identify the specialized assembly whose required capability is one of the supported capability on the platform.

13. The system according to claim 12, wherein the required capability of the specialized assembly corresponds to a most preferable capability according to a capability priority specified in the form of custom attributes in the platform capability-based assembly execution mechanism.

14. The system according to claim 9, wherein each of the at least one proxy includes:

a meta data retrieval mechanism capable of retrieving meta data of the specialized assembly, the meta data specifying information related to required capability and execution of the specialized assembly; and an assembly loading mechanism capable of determining the location where the specialized assembly is stored and loading the specialized assembly for execution.

15. The system according to claim 14, further comprising an assembly execution initiator capable of initiating the execution of the specialized assembly after the specialized assembly is loaded for execution.

16. An article comprising a storage medium having stored thereon instructions that, when executed by a machine, result in the following:

initiating an application on a platform of a device, the application including a platform capability-dependent assembly to perform a specific function of the application;

determining at least one capability that the platform supports according to at least one capability profile of the platform, the at least one capability being a processing capability of the platform including at least one of an audio processing capability, a video processing capability, and a graphics processing capability;

dynamically selecting a first specialized assembly associated with the platform capability-dependent assembly if the capability profile indicates that the platform supports a first capability;

dynamically selecting a second specialized assembly associated with the platform capability-dependent assembly if the capability profile indicates that the platform supports a second capability, wherein said selecting a specialized assembly comprises;

determining whether there are more than one capability supported on the platform of the device;

retrieving custom attributes when there are more than one capability supported by the platform of the device;

identifying a best-fit capability according to at least one custom attribute specifying priority among different capabilities;

determining the specialized assembly corresponding to the best-fit capability, wherein the capability required by the specialized assembly matches the best-fit capability; and determining the specialized assembly wherein the capability required by the specialized assembly is supported by the platform when there is only one supported capability; and executing the selected specialized assembly on the platform via a proxy corresponding to the specialized assembly.

17. The article comprising a storage medium having stored thereon instructions according to claim 16, wherein said determining the at least one supported capability comprises:

sending a query to the platform of the device to obtain the at least one capability profile, each of which describing a capability supported by the platform of the device;

receiving the at least one capability profile from the platform of the device; and determining the at least one supported capability based on the at least one capability profile.

18. The article comprising a storage medium having stored thereon instructions according to claim 17, wherein each of the at least one capability profile includes at least one of: a profile identifier capable of uniquely identifying a capability supported by the platform; a profile assembly name representing an assembly corresponding to the supported capability; and a profile assembly version representing the version of the assembly of the supported capability.

19. The article comprising a storage medium having stored thereon instructions according to claim 18, wherein the platform capability-dependent assembly includes at least one specialized assembly, each of which includes meta data and executable code of the specialized assembly.

20. The article comprising a storage medium having stored thereon instructions according to claim 19, wherein the meta data in each of the at least one specialized assembly includes at least one of: a capability required to execute the specialized assembly; and an entry point from which the specializes assembly is executed.

21. The article comprising a storage medium having stored thereon instructions according to claim 16, the instructions, when executed by a machine, further result in loading the specialized assembly prior to said executing.

22. The article comprising a storage medium having stored thereon instructions according to claim 21, wherein said loading the specialized assembly comprises:

retrieving the specialized assembly from a local storage if the specialized assembly is locally stored; and retrieving the specialized assembly from a remote location if the specialized assembly is not locally stored.

23. The article comprising a storage medium having stored thereon instructions according to claim 22, wherein said retrieving from a remote location comprises:

determining the remote location where the specialized assembly is stored; connecting to the remote location; and downloading the specialized assembly from the remote location.

* * * * *